United States Patent
Tsutsumi et al.

(10) Patent No.: US 12,516,163 B2
(45) Date of Patent: Jan. 6, 2026

(54) HEAT-CURABLE MALEIMIDE RESIN COMPOSITION FOR RTM, FIBER-REINFORCED COMPOSITE MATERIAL AND RADOME

(71) Applicant: Shin-Etsu Chemical Co., Ltd., Tokyo (JP)

(72) Inventors: Yoshihiro Tsutsumi, Annaka (JP); Tadaharu Ikeda, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 634 days.

(21) Appl. No.: 17/957,378

(22) Filed: Sep. 30, 2022

(65) Prior Publication Data
US 2023/0133834 A1    May 4, 2023

(30) Foreign Application Priority Data

Oct. 28, 2021  (JP) ................. 2021-176167
Mar. 11, 2022  (JP) ................. 2022-037690

(51) Int. Cl.
| | | |
|---|---|---|
| C08L 79/08 | (2006.01) | |
| C08F 222/40 | (2006.01) | |
| C08F 290/06 | (2006.01) | |
| C08J 5/04 | (2006.01) | |
| C08K 5/13 | (2006.01) | |
| C08L 33/24 | (2006.01) | |

(52) U.S. Cl.
CPC ........... *C08J 5/043* (2013.01); *C08F 222/404* (2020.02); *C08F 290/065* (2013.01); *C08K 5/13* (2013.01); *C08L 33/24* (2013.01); *C08L 79/085* (2013.01); *C08J 2333/24* (2013.01); *C08J 2379/08* (2013.01)

(58) Field of Classification Search
None
See application file for complete search history.

(56) References Cited

U.S. PATENT DOCUMENTS

| | | | | |
|---|---|---|---|---|
| 5,236,777 | A * | 8/1993 | Inoguchi | C08J 5/08 428/378 |
| 7,420,523 | B1 * | 9/2008 | Ziolkowski | H01Q 1/422 343/872 |
| 11,286,346 | B2 | 3/2022 | Tanigawa et al. | |
| 2018/0086025 | A1 * | 3/2018 | Yoshigahara | C08K 3/08 |
| 2020/0094495 | A1 | 3/2020 | Tomokuni et al. | |
| 2024/0043637 | A1 * | 2/2024 | Yamamoto | C08K 5/5313 |
| 2024/0182644 | A1 * | 6/2024 | Mizuguchi | C08L 79/085 |

FOREIGN PATENT DOCUMENTS

| | | |
|---|---|---|
| JP | 2001-2739 A | 1/2001 |
| JP | 2012-77124 A | 4/2012 |
| JP | 2016-131243 A | 7/2016 |
| JP | 2016-131244 A | 7/2016 |
| JP | 2020-45446 A | 3/2020 |
| JP | 2020-94100 A | 6/2020 |
| WO | WO 2016/114286 A1 | 7/2016 |
| WO | WO 2018/105380 A1 | 6/2018 |

OTHER PUBLICATIONS

Designer Molecules Tech Data Sheet BMI-689M (2020). (Year: 2020).*

* cited by examiner

*Primary Examiner* — David J Buttner

(74) *Attorney, Agent, or Firm* — Birch, Stewart, Kolasch & Birch, LLP

(57) ABSTRACT

Provided are a heat-curable maleimide resin composition for RTM that is used to produce a fiber-reinforced composite material such as FRP, and is superior in dielectric properties; and a fiber-reinforced composite material using such composition. The composition contains:

(A-1) a maleimide compound having at least one dimer acid skeleton-derived hydrocarbon group per one molecule, and having a viscosity of not higher than 20 Pa·s;

(A-2) a maleimide compound having at least one dimer acid skeleton-derived hydrocarbon group per one molecule, having a viscosity of greater than 20 Pa·s, and exhibiting a fluidity at 25° C.;

(B) a radical polymerization initiator; and (C) a polymerization inhibitor, wherein the viscosities of the components (A-1) and (A-2) are measured in accordance with a method described in JIS Z8803: 2011, at a measurement temperature of 25° C., and using a Brookfield-type rotary viscometer with a rotation rate of a spindle being set to 5 rpm.

11 Claims, No Drawings

HEAT-CURABLE MALEIMIDE RESIN COMPOSITION FOR RTM, FIBER-REINFORCED COMPOSITE MATERIAL AND RADOME

BACKGROUND OF THE INVENTION

Field of the Invention

The present invention relates to a heat-curable maleimide resin composition for RTM, a fiber-reinforced composite material using such composition, and a radome having such fiber-reinforced composite material.

Background Art

Fiber-reinforced composite materials such as an FRP (fiber-reinforced plastic) composed of a reinforced fiber and a matrix resin are suitable for material designing utilizing the advantages of reinforced fibers and matrix resins; fiber-reinforced composite materials can thus be used for many purposes such as those involving aerospace, sports, general industry and vehicle installation, and there will be even more purposes of their uses.

As a matrix resin, while there can be employed both a heat-curable resin and a thermoplastic resin, heat-curable resins are often used as reinforced fibers can be easily impregnated therewith. As a heat-curable resin, there can be used, for example, an epoxy resin, an unsaturated polyester resin, a modified (meth)acrylate resin, a vinyl ester resin, a phenolic resin and a cyanate resin (e.g. JP-A-2001-2739, JP-A-2012-77124, WO2018/105380 and JP-A-2020-94100). As a reinforced fiber, there can be used, for example, a glass fiber, an aramid fiber, a carbon fiber and a boron fiber.

As a method for producing a fiber-reinforced composite material, there may be employed, for example, a prepreg method, a hand lay-up method, a sprayup method, a filament winding method and an RTM (resin transfer molding) method.

Meanwhile, in recent years, the next generation communication system 5G has prevailed exceeding the millimeter wave region of 26 to 80 GHz, and even the development of the more advanced generation communication system 6G has started taking place; attempts are now being made to realize communication at a higher speed, a larger capacity and a lower latency. In order to realize these objectives, a material for use in a high-frequency band of 3 to 80 GHz is required, and since reduction in transmission loss is essential as a countermeasure to noises, it is required that there be developed an insulating material having excellent dielectric properties (low relative permittivity and low dielectric tangent).

Even in the case of FRP, the development of 5G-related materials is required; particularly, the development of a radome or the like has become necessary. As for FRP, relative permittivity is particularly critical; specifically, while it is considered that it is important to employ a material with a low relative permittivity, it is extremely difficult for the existing materials to meet such requirement i.e. the development of an alternative material is desired.

In recent years, as a heat-curable resin superior in dielectric properties, reports have been made on heat-curable resin compositions using dimer diamine skeleton-containing maleimide compounds (WO2016/114286, JP-A-2016-131243, JP-A-2016-131244 and JP-A-2020-45446). While there are descriptions about how these materials can be used for boards of which a main purpose is their uses in printed wiring boards, there are no descriptions about the application thereof to an FRP purpose; even when actually attempting to produce a radome employing a prepreg using any of these materials, a poor handling property will be exhibited due to a tackiness in an uncured state i.e. it has been difficult to apply these materials to FRP purposes.

SUMMARY OF THE INVENTION

Thus, it is an object of the present invention to provide a heat-curable maleimide resin composition for RTM that is used to produce a fiber-reinforced composite material such as FRP, and is superior in dielectric properties; a fiber-reinforced composite material using such composition; and a radome having such fiber-reinforced composite material.

The inventors of the present invention diligently conducted a series of studies to solve the abovementioned problems, and completed the invention as follows. That is, the inventors found that the above object can be achieved by the heat-curable maleimide resin composition described below.

[1]

A heat-curable maleimide resin composition for RTM, comprising:

(A-1) a maleimide compound having at least one dimer acid skeleton-derived hydrocarbon group per one molecule, and having a viscosity of not higher than 20 Pa·s;

(A-2) a maleimide compound having at least one dimer acid skeleton-derived hydrocarbon group per one molecule, having a viscosity of greater than 20 Pa·s, and exhibiting a fluidity at 25° C.;

(B) a radical polymerization initiator; and (C) a polymerization inhibitor, wherein the viscosities of the components (A-1) and (A-2) are measured in accordance with a method described in JIS Z8803:2011, at a measurement temperature of 25° C., and using a Brookfield-type rotary viscometer with a rotation rate of a spindle being set to 5 rpm.

[2]

The heat-curable maleimide resin composition for RTM according to [1], wherein the composition has a viscosity of not higher than 3 Pa·s when measured in accordance with the method described in JIS Z8803:2011, at a measurement temperature of 60° C., and using a Brookfield-type rotary viscometer with a rotation rate of a spindle being set to 5 rpm.

[3]

The heat-curable maleimide resin composition for RTM according to [1] or [2], wherein the component (A-1) is a maleimide compound represented by the following formula (1):

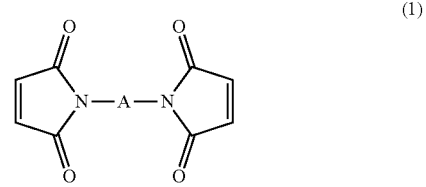

(1)

wherein A represents a dimer acid skeleton-derived hydrocarbon group.

[4]

The heat-curable maleimide resin composition for RTM according to any one of [1] to [3], wherein the component (A-2) is a maleimide compound represented by the following formula (2):

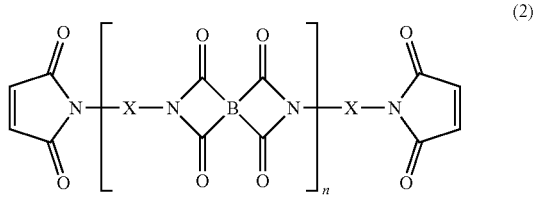

wherein B independently represents a cyclic structure-containing tetravalent organic group, X independently represents a divalent hydrocarbon group having 6 to 200 carbon atoms, at least one X is a dimer acid skeleton-derived hydrocarbon group, and n is 1 to 100.

[5]

The heat-curable maleimide resin composition for RTM according to [4], wherein B in the formula (2) is any one of the tetravalent organic groups represented by the following structural formulae:

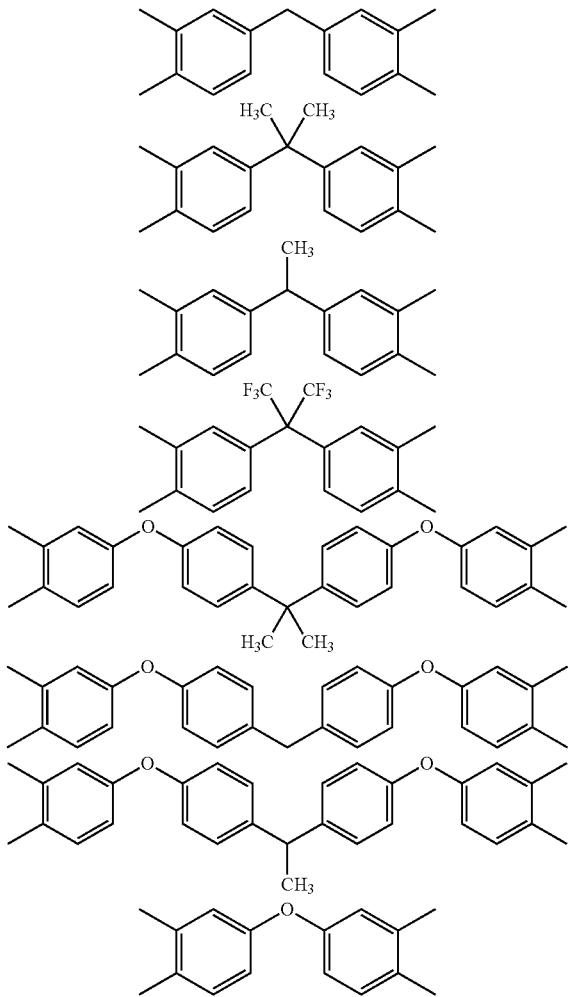

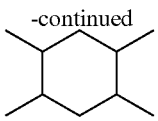

wherein bonds in these structural formulae that are yet unbonded to substituent groups are to be bonded to carbonyl carbons forming cyclic imide structures in the formula (2).

[6]

The heat-curable maleimide resin composition for RTM according to any one of [1] to [5], wherein a ratio between (A-1) and (A-2) on a mass basis is (A-1):(A-2)=95:5 to 40:60.

[7]

A fiber-reinforced composite material formed of the heat-curable maleimide resin composition for RTM according to any one of [1] to [6] and a reinforced fiber.

[8]

The fiber-reinforced composite material according to [7], wherein the reinforced fiber is a quartz glass fiber.

[9]

A radome having the fiber-reinforced composite material according to [8].

The heat-curable maleimide resin composition for RTM of the present invention is capable of being turned into a cured product having excellent dielectric properties such as a low relative permittivity in a high-frequency region, and is superior in moldability due to a favorable fluidity of the composition. Thus, the heat-curable maleimide resin composition for RTM of the present invention is suitable for use in a fiber-reinforced composite material, and such fiber-reinforced composite material using the composition of the present invention is then suitable for use in a radome or the like.

DETAILED DESCRIPTION OF THE INVENTION

The present invention is described in greater detail hereunder.

At first, RTM (Resin transfer molding) is described. RTM is a molding method where a reinforced fiber base material is to be placed in a mold, the mold is then closed, a resin is then injected thereinto (injection step), the mold is then filled with the resin by flowing the resin between the fibers of the reinforced fiber base material, the resin is then cured, and the mold is then opened to take out a molded product. There, it is preferred that the resin to be injected be such a resin composition exhibiting: a low viscosity at the time of carrying out the injection step to inject the same into the reinforced fiber base material; and a suppressed increase in viscosity as well as a superior impregnation property during the injection step. There, it is preferred that an injection temperature be a temperature from room temperature to 100° C.

Further, it is preferred that the resin to be injected have a low viscosity. Specifically, it is required that the resin be injected at a temperature between room temperature and 100° C., at which the viscosity thereof will be maintained low and does not increase easily; it is preferred that a viscosity at the injection temperature be not higher than 3 Pa·s. Meanwhile, a high-speed curing is required in a high-temperature region such as 150 to 180° C.; it is necessary to realize both of these features.

Thus, the heat-curable maleimide resin composition for RTM of the present invention has a characteristic(s) where the viscosity thereof is maintained low and does not increase easily in a temperature range of room temperature to 100° C., and where the composition itself will cure rapidly in the temperature range of 150 to 180° C.

RTM with regard to the heat-curable maleimide resin composition for RTM of the present invention includes VaRTM (vacuum assistant resin transfer molding) which is also called vacuum RTM where a resin is to be injected after vacuum-sucking the inner region of a mold.

(A) Particular Maleimide Compound

A component (A) includes two kinds of maleimide compounds which are a component (A-1) and a component (A-2), each of which has at least one dimer acid skeleton-derived hydrocarbon group per one molecule.

The dimer acid mentioned here is a liquid dibasic acid whose main component is a dicarboxylic acid having 36 carbon atoms, and is produced by dimerizing an unsaturated fatty acid having 18 carbon atoms and whose raw material is a natural substance such as a vegetable fat or oil. The dimer acid is not limited to a single type of skeleton, but may have multiple types of structures, where there may exit several types of isomers thereof. Typical dimer acids are grouped into the categories of (a) linear type, (b) monocyclic type, (c) aromatic ring type, and (d) polycyclic type.

In this specification, a dimer acid skeleton refers to a group derived from a dimer diamine having a structure established by substituting the carboxy group(s) in such dimer acid with a primary aminomethyl group. That is, it is preferred that the component (A) have, as a dimer acid skeleton, a group obtained by substituting the two carboxy groups in any of the dimer acids represented by the following (a) to (d) with methylene groups.

Further, as for the dimer acid skeleton-derived hydrocarbon group(s) possessed by the component (A), it is more preferred that such dimer acid skeleton-derived hydrocarbon group have a structure with fewer carbon-carbon double bonds therein as a result of a hydrogenation reaction, in terms of heat resistance and reliability of the cured product.

(a)

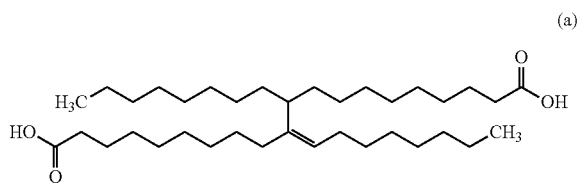

(b)

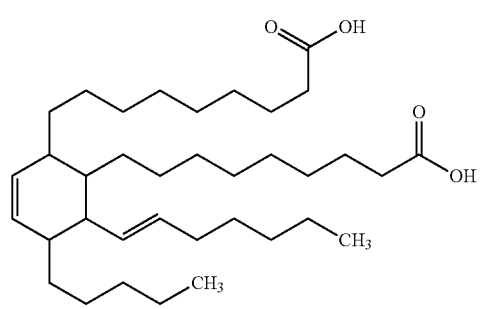

(c)

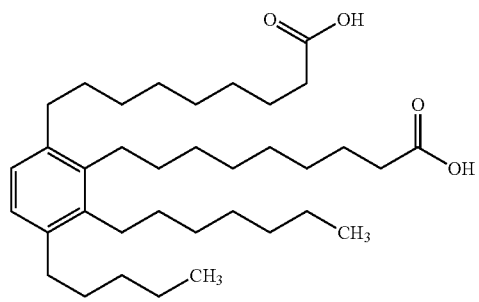

(d)

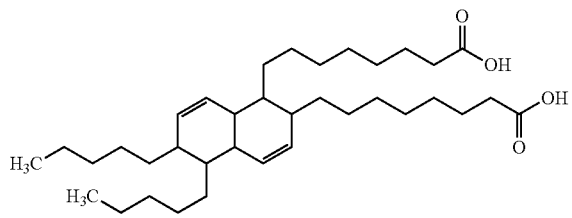

(A-1) Maleimide compound having at least one dimer acid skeleton-derived hydrocarbon group per one molecule, and having a viscosity of not higher than 20 Pa·s at 25° C.

The component (A-1) is a maleimide compound having at least one dimer acid skeleton-derived hydrocarbon group per one molecule. In terms of ease of access of raw materials and stability of synthesis, it is preferred that the maleimide compound as the component (A-1) be a bismaleimide compound having two maleimide groups per one molecule.

Further, from the perspectives of handling property at room temperature and achieving a lower viscosity at the time of injection, the component (A-1) is a maleimide compound having a viscosity of not higher than 20 Pa·s, preferably 1 to 20 Pa·s, when measured at 25° C. and under the following measurement condition.

Measurement condition: measurement is performed in accordance with a method described in JIS Z8803:2011, at a designated measurement temperature, and using a Brookfield-type rotary viscometer with the rotation rate of the spindle being set to 5 rpm.

Here, in this specification, unless otherwise noted, a viscosity refers to a value measured at a temperature identified as the "designated measurement temperature" in the above condition.

It is preferred that the maleimide compound as the component (A-1) be a maleimide compound represented by the following formula (1). The maleimide compound represented by the following formula (1) has a low viscosity at room temperature, and a handling property of the composition at room temperature can thus be improved if the composition contains this maleimide compound; further, by adding this maleimide compound to the heat-curable maleimide resin composition, the cured product of the composition will exhibit a relative permittivity of not higher than 2.6 and a dielectric tangent of not higher than 0.004 when measured at a frequency of 4 to 80 GHz i.e. the cured product will exhibit excellent dielectric properties. Here, one kind of the component (A-1) may be used alone, or two or more kinds thereof may be used in a mixed form.

(1)

In the formula (1), A represents a dimer acid skeleton-derived hydrocarbon group.

(A-2) Maleimide Compound Other than (A-1), Having at Least One Dimer Acid Skeleton-Derived Hydrocarbon Group Per One Molecule The component (A-2) is a maleimide compound having at least one dimer acid skeleton-derived hydrocarbon group per one molecule, having a viscosity of greater than 20 Pa·s at 25° C., and having a fluidity at 25° C.; the maleimide compound as the component (A-2) is a compound different from the component (A-1).

In this specification, it can be said that a fluidity is confirmed if the maleimide compound placed in a bottle is capable of moving even at a slow speed when the bottle is tilted sideways; in terms of viscosity, "having a fluidity" refers to a state where the viscosity is 100 to 1,500 Pa·s when measured at 25° C. under the abovementioned measurement condition. From the perspective of handling property of the compound and the composition to be obtained, it is preferred that the viscosity of the component (A-2) be not higher than 1,200 Pa·s, more preferably not higher than 1,000 Pa·s. Further, since the component (A-2) is a component other than the component (A-1), the viscosity of the component (A-2) is greater than 20 Pa·s; however, it is preferred that the viscosity of the component (A-2) be not lower than 100 Pa·s, more preferably not lower than 200 Pa·s.

As the maleimide compound as the component (A-2), a maleimide compound represented by the following formula (2) may be listed as a preferable example thereof. By using such maleimide compound represented by the following formula (2), a strong adhesive force to a later-described reinforced fiber will be exhibited after curing so that a toughness of the cured product can be improved, and the cured product will be superior in dielectric properties in a way such that the relative permittivity thereof will be not higher than 2.6, and the dielectric tangent thereof will be not higher than 0.004, when measured at a frequency of 4 to 80 GHz.

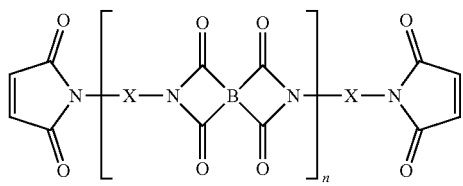

(2)

In the formula (2), B independently represents a cyclic structure-containing tetravalent organic group; X independently represents a divalent hydrocarbon group having 6 to 200 carbon atoms, where at least one X has a dimer acid skeleton; n is 1 to 100.

Here, in the formula (2), B independently represents a cyclic structure-containing tetravalent organic group. Particularly, it is preferred that this tetravalent organic group be any one of the tetravalent organic groups represented by the following structural formulae.

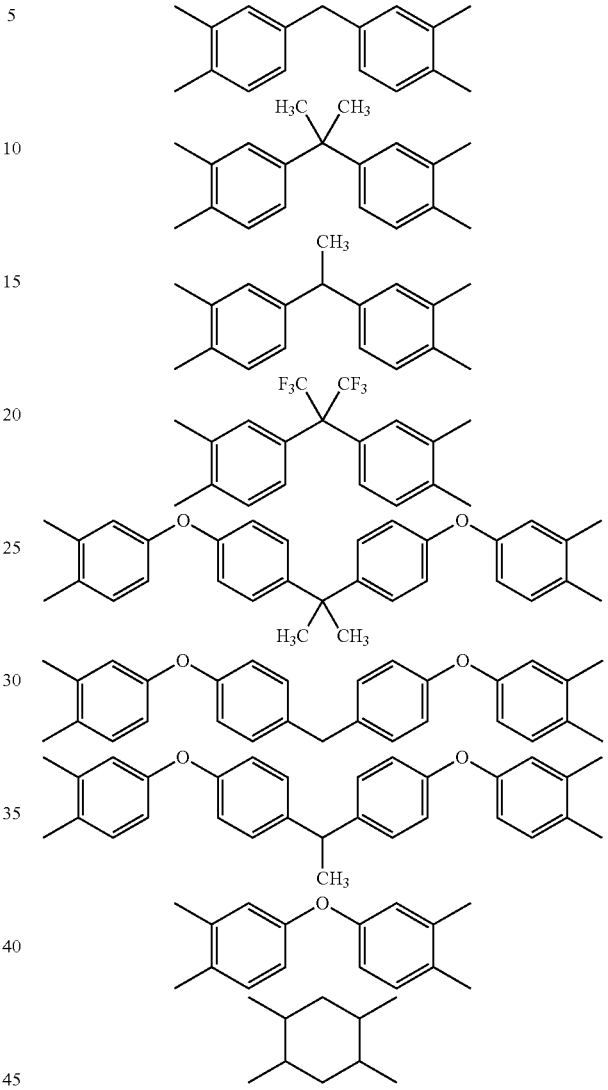

Bonds in these structural formulae that are yet unbonded to substituent groups are to be bonded to carbonyl carbons forming cyclic imide structures in the formula (2).

Further, in the formula (2), X independently represents a divalent hydrocarbon group having 6 to 200, preferably 8 to 100, more preferably 10 to 50 carbon atoms. Particularly, it is preferred that this divalent hydrocarbon group be a branched divalent hydrocarbon group with at least one hydrogen atom in the divalent hydrocarbon group being substituted by an alkyl or alkenyl group having 6 to 200, preferably 8 to 100, more preferably 10 to 50 carbon atoms. The branched divalent hydrocarbon group may be either a saturated aliphatic hydrocarbon group or an unsaturated hydrocarbon group, and an alicyclic structure or an aromatic ring structure may also be present midway through the molecular chain.

As the branched divalent hydrocarbon group, there may be specifically listed a divalent hydrocarbon group derived from a dual-end diamine called dimer diamine. Here, dimer diamine is a compound derived from a dimer (dimer acid) of the aforementioned unsaturated fatty acid (e.g. oleic acid). Thus, it is particularly preferred that X be a branched divalent hydrocarbon group obtained by substituting the two carboxy groups in any of the dimer acids represented by the above (a) to (d) with methylene groups.

In the formula (2), n is 1 to 100, preferably 1 to 60, more preferably 1 to 50. If n is too large, a solubility and fluidity will be impaired such that a poor moldability may be observed. Further, one kind of the component (A-2) may be used alone, or two or more kinds thereof may be used in a mixed form.

There are no particular restrictions on a number average molecular weight of the maleimide compound as the component (A-2); in terms of handling property of the composition, it is preferred that this number average molecular weight be 1,000 to 30,000, more preferably 1,200 to 10,000.

Here, the number average molecular weight mentioned in the present invention is a number average molecular weight measured by gel permeation chromatography (GPC) under the following conditions, where polystyrene is used as a reference substance.
Measurement Conditions
Developing solvent: Tetrahydrofuran (THF)
Flow rate: 0.35 mL/min
Detector: Refractive index detector (RI)
Column: TSK Guardcolumn Super H-L
　　TSK gel Super HZ4000 (4.6 mmI.D.×15 cm×1)
　　TSK gel Super HZ3000 (4.6 mmI.D.×15 cm×1)
　　TSK gel Super HZ2000 (4.6 mmI.D.×15 cm×2)
(All manufactured by TOSOH CORPORATION)
Column temperature: 40° C.
Sample injection volume: 5 μL (THF solution having a concentration of 0.2% by mass)

As for a ratio between the components (A-1) and (A-2) in the component (A), the ratio is (A-1):(A-2)=95:5 to 40:60 on a mass basis in consideration of the fact that the composition is liquid at room temperature before curing; and with curability also being put into consideration, it is preferred that such ratio be (A-1):(A-2)=93:7 to 45:55, more preferably (A-1):(A-2)=90:10 to 50:50, on a mass basis. If the component (A-1) is used alone, an excessively high reactivity will be observed such that the composition will lack preservation stability.

Further, it is preferred that the component (A) be contained in the heat-curable maleimide resin composition for RTM of the present invention by an amount of 50 to 99.5% by mass, more preferably 60 to 99% by mass, even more preferably 65 to 99% by mass.
(B) Radical Polymerization Initiator A radical polymerization initiator as a component (B) is added to promote a cross-linking reaction of the maleimide compound as the component (A), and a radical polymerization reaction between the maleimide groups in the component (A) and reaction groups that are reactive with these maleimide groups.

There are no particular restrictions on the component (B) so long as it is capable of promoting a radical polymerization reaction. Examples thereof may include an organic peroxide such as diallyl peroxide, dialkyl peroxide, peroxide carbonate and hydroperoxide; and an azo compound such as azoisobutyronitrile and 1,1'-azobis(cyclohexanecarbonitrile), of which an organic peroxide is preferably used.

Examples of an organic peroxide include dicumyl peroxide, t-butyl peroxybenzoate, t-amyl peroxybenzoate, dibenzoyl peroxide, dilauroyl peroxide, 2,5-dimethyl-2,5-di(t-butylperoxy)hexane, 1,1-di(t-butylperoxy)cyclohexane, di-t-butyl peroxide and dibenzoyl peroxide.

An amine compound is capable of causing an addition reaction between the amino groups therein and the maleimide groups in the maleimide compound as the component (A), but is not suitable for use in the composition of the present invention due to a poor preservation stability. Further, a polymerization reaction by an imidazole compound is also possible; however, since a reaction at an extremely high temperature will be necessary in such case, it is not preferable to use an imidazole compound in the composition of the present invention in terms of productivity.

It is preferred that the radical polymerization initiator be added in an amount of 0.05 to 10 parts by mass, more preferably 0.1 to 5 parts by mass, per 100 parts by mass of the component (A). Further, if a later-described other heat-curable resin is to be added to the composition, the radical polymerization initiator is added in an amount of 0.05 to 10 parts by mass, particularly preferably 0.1 to 5 parts by mass, per 100 parts by mass of a sum total of the component (A) and the other heat-curable resin component. It is not preferable if the amount of the radical polymerization initiator added is out of the above range(s), because curing may take place either extremely slowly or extremely quickly at the time of molding the maleimide resin composition, and there may be observed a poor balance between the heat resistance and the moisture resistance of the cured product obtained.

One kind of the radical polymerization initiator as the component (B) may be used alone, or two or more kinds thereof may be used in combination.
(C) Polymerization Inhibitor A component (C) used in the present invention is a polymerization inhibitor. The polymerization inhibitor is added not only to improve the preservation stability of the heat-curable maleimide resin composition for RTM of the present invention, but also to suppress an increase in viscosity when injecting the resin at a temperature higher than room temperature; there are no particular restrictions on the polymerization inhibitor so long as it is able to bring about these effects.

Examples of the polymerization inhibitor include those that are generally used, such as catechol, resorcinol and 1,4-hydroquinone. Further, there may be listed, for example, an alkylcatechol-based compound such as 2-methylcatechol, 3-methylcatechol, 4-methylcatechol, 2-ethylcatechol, 3-ethylcatechol, 4-ethylcatechol, 2-propylcatechol, 3-propylcatechol, 4-propylcatechol, 2-n-butylcatechol, 3-n-butylcatechol, 4-n-butylcatechol, 2-tert-butylcatechol, 3-tert-butylcatechol, 4-tert-butylcatechol and 3,5-di-tert-butylcatechol; an alkylresorcinol-based compound such as 2-methylresorcinol, 4-methylresorcinol, 2-ethylresorcinol, 4-ethylresorcinol, 2-propylresorcinol, 4-propylresorcinol, 2-n-butylresorcinol, 4-n-butylresorcinol, 2-tert-butylresorcinol and 4-tert-butylresorcinol; an alkylhydroquinone-based compound such as methyl hydroquinone, ethyl hydroquinone, propyl hydroquinone and tert-butyl hydroquinone; a phosphine compound such as tributylphosphine, trioctylphosphine, tricyclohexylphosphine and triphenylphosphine; a phosphine oxide compound such as trioctylphosphine oxide and triphenylphosphine oxide; a phosphite compound such as triphenylphosphite and trisnonylphenylphosphite; a hindered amine-based compound such as 2,2,6,6-tetramethylpiperidin-1-oxyl and 4-hydroxy-2,2,6,6-tetramethylpiperidin-1-oxyl; a naphthalene compound such as ammonium 1,4-dihydroxy-2-naphthalene sulfonate and 4-methoxy-1-naphthol; a naphthoquinone compound such as 1,4-naphthoquinone, 2-hydroxy-1,4-naphthoquinone and anthrone; and a phenol-based antioxidant such as pyrogallol, phloroglucin and 4,4'-butylidene-bis(6-tert-butyl-m-cresol).

It is preferred that the polymerization inhibitor as the component (C) be contained in an amount of 0.01 to 0.80 parts by mass, more preferably 0.02 to 0.60 parts by mass, even more preferably 0.03 to 0.50 parts by mass, per 100 parts by mass of the component (A).

Further, if the composition of the present invention contains the later-described heat-curable resin which is other than the component (A) and has a reactive group(s) reactive with maleimide groups, the component (C) is preferably contained in an amount of 0.01 to 0.70 parts by mass, more preferably 0.02 to 0.60 parts by mass, even more preferably 0.03 to 0.50 parts by mass, per 100 parts by mass of the sum total of the component (A) and the heat-curable resin which is other than the component (A) and has a reactive group(s) reactive with maleimide groups (the two components may altogether be simply referred to as "heat-curable resin component" hereunder).

When the amount of the component (C) added is smaller than 0.01 parts by mass per 100 parts by mass of the component (A), a weaker polymerization inhibition effect may be observed; when the amount of the component (C) added is larger than 0.80 parts by mass per 100 parts by mass of the component (A), not only the polymerization inhibition effect will peak out, and improvements in preservation stability cannot be much expected, but a curability may also be negatively affected as well.

Further, one kind of the component (C) may be used alone, or two or more kinds thereof may be used in a mixed form.

Other Additives

If necessary, the heat-curable maleimide resin composition of the present invention may further contain various additives other than the components (A) to (C), provided that the effects of the present invention will not be impaired. Examples of these additives are as follows. Heat-curable resin having reactive group reactive with maleimide group The present invention may further contain a heat-curable resin having a reactive group(s) reactive with maleimide groups.

There are no restrictions on the type of such heat-curable resin, examples of which may include various resins other than the component (A), such as an epoxy resin, a phenolic resin, a melamine resin, a silicone resin, a cyclic imide resin such as a maleimide compound other than the component (A), a urea resin, a heat-curable polyimide resin, a modified polyphenylene ether resin, a heat-curable acrylic resin, and an epoxy-silicone hybrid resin. Further, as a reactive group(s) reactive with maleimide groups, there may be listed, for example, an epoxy group, a maleimide group, a hydroxyl group, an acid anhydride group, an alkenyl group such as an allyl group and a vinyl group, a (meth)acrylic group, and a thiol group.

In terms of reactivity, it is preferred that the reactive group of the heat-curable resin be that capable of undergoing radical polymerization, preferable examples of which may include a maleimide group, an alkenyl group and a (meth) acrylic group, of which an alkenyl group or a (meth)acrylic group is more preferred from the perspective of dielectric property.

Here, the heat-curable resin having a reactive group(s) reactive with maleimide groups is added in an amount of 0 to 60% by mass per the sum total of the heat-curable resin. Additives other than the heat-curable resin Other than the abovementioned heat-curable resin, there may further be added, for example, a non-functional silicone oil, a thermoplastic resin, a thermoplastic elastomer, an organic synthetic rubber, an inorganic filler, a thixotropy imparting agent, a photosensitizer, a light stabilizer, a flame retardant, a pigment, a dye, an adhesion aid such as a silane coupling agent, a mold release agent, an antioxidant and a plasticizer.

Production Method

The heat-curable maleimide resin composition of the present invention can be produced by the following method.

For example, the maleimide compounds as the components (A-1) and (A-2), the radical polymerization initiator as the component (B) and the polymerization inhibitor (C) may be simultaneously or separately mixed, stirred, dissolved and/or dispersed while performing a heating treatment if necessary, thereby obtaining a mixture of the components (A) to (C). Further, depending on an intended purpose of use, one or more kinds of the aforementioned other additives may be added thereto and mixed therewith.

In the above production method, there are no particular restrictions on a device for performing mixing, stirring and dispersion. Specifically, there may be used, for example, a grinding machine equipped with a stirring and heating apparatuses, a twin roll mill, a triple roll mill, a ball mill, a planetary mixer or a mass colloider; these devices may be appropriately used in combination.

Fiber-Reinforced Composite Material

The composition of the present invention is a heat-curable maleimide resin composition for RTM, and can be turned into a fiber-reinforced composite material (FRP) when cured in combination with a reinforced fiber.

Examples of the reinforced fiber include a glass fiber such as a quartz glass fiber, E glass fiber, T glass fiber and S glass fiber; an organic fiber such as an acrylic fiber, PBO fiber and nylon fiber; a carbon fiber; a boron fiber; and a metal fiber such as a copper fiber and iron fiber.

One kind of the reinforced fibers may be used alone, or two or more kinds of them may be used in combination. Particularly, preferred is a quartz glass fiber in that the amount of impurities is small and dielectric properties is excellent.

As a quartz glass fiber, it is preferred that the quartz glass fiber be selected from a quartz cloth, a quartz chopped strand, a quartz unwoven cloth and a quartz wool. While the quartz glass fiber may be in the form of a fiber, a fabric called glass cloth, a quartz chopped strand, an unwoven cloth or a quartz wool, it is more preferred that a quartz glass cloth be used as it is, for example, easy to be handled. Further, as a quartz glass cloth, there may be listed, for example, a plain-woven cloth, a sateen-woven cloth and a twill-woven cloth, of which a plain-woven cloth and a sateen-woven cloth are preferred in terms of, for example, uniformity in thickness.

A quartz glass cloth is for example produced using a quartz glass strand and/or a quartz glass yarn. A quartz glass strand and/or a quartz glass yarn is produced by bundling 50 to 500 threads of the abovementioned quartz glass fiber.

Further, in order to improve an adhesiveness between the maleimide resin composition and the quartz glass fiber, it is preferred that the surface of the quartz glass fiber be treated with a silane coupling agent. Examples of a silane coupling agent include an epoxy group-containing alkoxysilane, an amino group-containing alkoxysilane, a (meth)acrylic group-containing alkoxysilane and an alkenyl group-containing alkoxysilane.

Particularly, a (meth)acrylic group- and/or amino group-containing alkoxysilane(s) are favorably used, specific examples of which include 3-methacryloxypropyltrimethoxysilane, 3-acryloxypropyltrimethoxysilane, N-phenyl-3-aminopropyltrimethoxysilane, N-2-(aminoethyl)-3-aminopropyltrimethoxysilane and 3-aminopropyltrimethoxysilane. Here, one kind of them may be used alone, or two or more kinds of them may be used in a mixed form. Also, the silane coupling agent used shall not be limited to those listed above.

Described hereunder is a method for producing a fiber-reinforced composite material with the aid of RTM method, using the heat-curable maleimide resin composition of the present invention.

The fiber-reinforced composite material of the present invention is produced by injecting a warmed heat-curable maleimide resin composition into a reinforced fiber base material placed in a mold that has already been heated to a given temperature, impregnating the base material with the composition as a result, and then curing the composition inside the mold.

In terms of impregnating ability to the reinforced fiber base material, a temperature for warming the heat-curable maleimide resin composition is determined based on a correlation between an initial viscosity of the present resin composition and an increase in viscosity; it is preferred that such temperature be 40 to 100° C., more preferably 50 to 90° C. There, as a rough indication of temperature and viscosity, a viscosity at 60° C. is 0.01 to 3 Pa·s, more preferably 0.02 to 2 Pa·s.

Further, in the production method of the fiber-reinforced composite material, there can be selected an appropriate condition(s) in accordance with the fiber-reinforced composite material to be obtained, such as a condition where a mold having multiple inlets is used so that the maleimide resin composition may be injected from the multiple inlets at a time, or sequentially injected therefrom with a time difference. There are no restrictions on the number and shape of the inlets; the larger the number of the inlets is, the more preferable it is as injection can be completed in a short period of time, and it is preferred that the inlets be arranged in positions capable of shortening the flow length of the resin in accordance with the shape of the molded product.

An injection pressure in RTM using a maleimide resin composition is normally 0.1 to 20.0 MPa. Here, there may also be employed a VaRTM method where the resin composition is injected after vacuum-sucking the inner region of the mold; if employing VaRTM, it is preferred that the injection pressure be 0.1 to 5.0 MPa in terms of injection time and economic efficiency of equipments.

After the reinforced fiber base material has been impregnated with the maleimide resin composition, the fiber-reinforced composite material can then be obtained by performing curing at a mold inner temperature of 120 to 200° C., preferably 130 to 190° C. for 20 to 600 min, preferably 30 to 300 min.

The fiber-reinforced composite material thus obtained is superior in dielectric properties and moldability. Thus, as a fiber-reinforced plastic (FRP), this composite material is suitable for use in applications such as a radome, an antenna for communication and a printed circuit board, and is particularly suitable for use in a radome.

A radome serves to protect antennas from a natural environment involving rain and wind etc., and visually hide antennas or the like so as to prevent contacts. In recent years, a next-generation communication system called 5G has prevailed; particularly, in the case of a radome for a communication system utilizing a high-frequency region such as a millimeter-wave region of 26 to 80 GHz, not only an antenna protectivity is required, but dielectric properties such as a low relative permittivity and a low dielectric tangent are also required for the purpose of reducing transmission and reception losses of electric waves as much as possible.

Further, the shape of a radome may vary broadly depending on the installation site and purpose of the radome; a material of a radome is also required to possess an excellent moldability.

Therefore, the heat-curable maleimide resin composition for RTM of the present invention and the fiber-reinforced composite material using the same are preferable as materials for a radome, because the composition provides a cured product having excellent dielectric properties such as a low relative permittivity in a high-frequency region, and has a favorable fluidity as well as a superior moldability.

Here, although the resin composition of the present invention is dedicated to RTM, it may also be used in other molding methods such as a hand lay-up method if necessary. Further, the resin composition of the present invention may also be used for other purposes such as an adhesive agent.

WORKING EXAMPLES

The present invention is described in detail hereunder with reference to working and comparative examples; the present invention shall not be limited to the following working examples.

(A-1) Maleimide compound having at least one dimer acid skeleton-derived hydrocarbon group per one molecule, and having a viscosity of not higher than 20 Pa·s at 25° C.

(A-1-1): Bismaleimide compound containing dimer acid skeleton-derived hydrocarbon group, as represented by the following formula (X-45-6895 by Shin-Etsu Chemical Co., Ltd., viscosity at 25° C.: 3.5 Pa·s)

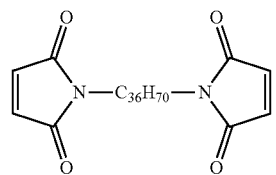

—$C_{36}H_{70}$— represents a dimer acid skeleton-derived structure.

(A-2) Maleimide compound having at least one dimer acid skeleton-derived hydrocarbon group per one molecule, having a viscosity of greater than 20 Pa·s at 25° C., and exhibiting a fluidity at 25° C.

(A-2-1): Fluid bismaleimide compound containing dimer acid skeleton-derived hydrocarbon group, as represented by the following formula (X-45-1400 by Shin-Etsu Chemical Co., Ltd., viscosity at 25° C.: 450 Pa·s, number average molecular weight 1,500)

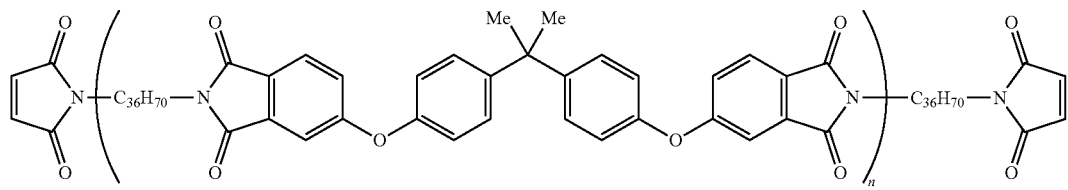

—C₃₆H₇₀— represents a dimer acid skeleton-derived structure.
n≈2 (average value)

(A-2-2): Fluid bismaleimide compound containing dimer acid skeleton-derived hydrocarbon group, as represented by the following formula (X-45-1500 by Shin-Etsu Chemical Co., Ltd., viscosity at 25° C.: 500 Pa·s, number average molecular weight 1,500)

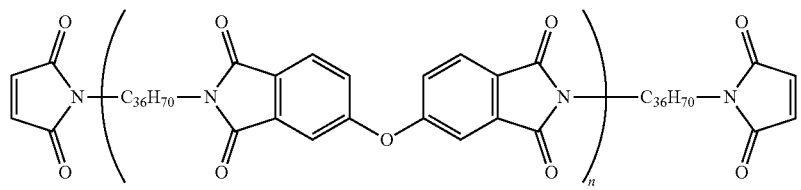

n≈2 (average value)
—C₃₆H₇₀— represents a dimer acid skeleton-derived structure.

(A-3) Maleimide compound for comparative example (A-3-1): Non-fluid bismaleimide compound containing dimer acid skeleton-derived hydrocarbon group, as represented by the following formula (BMI-5000 by Designer Molecules Inc., Non-fluid at 25° C. (powder form), number average molecular weight 10,000)

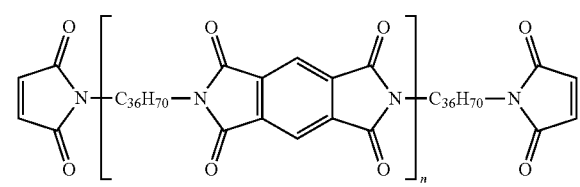

—C₃₆H₇₀— represents a dimer acid skeleton-derived structure.
n≈10 (average value)

(A-3-2): 1,6-bismaleimide-(2,2,4-trimethyl)hexane (BMI-TMH by Daiwakasei Industry Co., LTD., solid at 25° C.)

(A-3-3): Bisphenol-A-diphenylether bismaleimide (BMI-4000 by Daiwakasei Industry Co., LTD., solid at 25° C.)

(B) Reaction Initiator (B-1): 2,5-dimethyl-2,5-di(t-butylperoxy)hexane (Trigonox 101 by KAYAKU NOURYON CORPORATION)

(B-2): 2-ethyl-4-methylimidazole (2E4MZ by SHIKOKU CHEMICALS CORPORATION, for use in comparative example)

(C) Polymerization Inhibitor (C-1): 4,4'-butylidene-bis(6-tert-butyl-m-cresol) (ANTAGE W-300 by Kawaguchi Chemical Industry Co., LTD.)

(D) Resin Composition for Comparative Example (D-1): Epoxy resin composition produced by the following method Here, 100 g of a bisphenol A-type epoxy resin (YD-128 by NIPPON STEEL Chemical & Material Co., Ltd.), 90 g of a mixture of methyl hexahydrophthalic acid and hexahydrophthalic acid (RIKACID MH-700 by New Japan Chemical Co., Ltd.) and 10 g of 1,2-dimethylimidazole (CUREZOL 1,2-DMZ by SHIKOKU CHEMICALS EZOL 1,2-DMZ by SHIKOKU CHEMICALS CORPORATION) were put into a 500 mL flask, followed by stirring them at room temperature for 30 min to obtain an epoxy resin composition (D-1).

(D-2): Epoxy resin composition produced by the following method

Here, 100 g of 1,3-bis(aminomethyl)cyclohexane (1,3-BAC by MITSUBISHI GAS CHEMICAL COMPANY, INC.) and 3 g of methanesulfonic acid (by TOYOBO CO., LTD.) were put into a 500 mL flask, followed by stirring them at room temperature for an hour. Further, 141 g of the bisphenol A-type epoxy resin (YD-128 by NIPPON STEEL Chemical & Material Co., Ltd.) was then added to this flask, followed by performing stirring at room temperature for 30 min to obtain an epoxy resin composition (D-2).

(D-3): Unsaturated polyester resin composition (U-Pica 4001 by Japan U-pica.co.ltd) and curing accelerator (PR-D by Japan U-pica.co.ltd), compounding ratio 100:1 (mass ratio)

Sample Preparation: Working Examples 1 to 7; Comparative Examples 1 to 10

A gate mixer was used to mix the components at the compounding ratios shown in Tables 1 and 2 so as to prepare a resin composition(s). As for comparative examples 4 to 7, since mixing was difficult due to the high melting points of the components to be blended, the components were mixed at 80° C. until they were well blended as a whole; in the case of the comparative example 7, since (A-3-3) as one of the components did not dissolve and remained completely separated, evaluations were not conducted.

As for the resin compositions (D-1) to (D-3) for use in the comparative examples, there were used those prepared by the above methods.

Viscosity, Preservation Stability

In accordance with a method described in JIS Z8803: 2011, a Brookfield-type rotary viscometer was used to measure a viscosity at a spindle rotation rate of 5 rpm under measurement temperatures of 25° C. and 60° C. Next, the viscosity of each resin composition that had been left at 25° C. for 72 hours was likewise measured at a measurement temperature of 25° C. so as to check a preservation stability thereof. Further, the viscosity of each resin composition that had been left at 60° C. for 10 min was likewise measured at a measurement temperature of 60° C.

Dielectric Property and Curability

A frame having a size of 70 mm×70 mm and a thickness of 200 μm was prepared, and each resin composition was then sandwiched by a 50 μm thick PET film (E7006 by TOYOBO CO., LTD.) that had been subjected to a mold release treatment, followed by using a vacuum pressing machine (by Nikko-Materials Co., Ltd.) to perform molding at 150° C. for 5 min so as to produce a cured product (molded film). As an evaluation of curability, "○" was given to those that had cured under this condition, and "x" was given to those that did not cure under this condition, where dielectric property evaluation was not conducted on those that did not cure.

The molded film was then subjected to post curing at 180° C. for an hour to obtain a cured resin film. A network analyzer (E5063-2D5 by Keysight Technologies) and a stripline (by KEYCOM Corporation) were then connected using such cured resin film to measure a relative permittivity and a dielectric tangent thereof at frequencies of 10 GHz and 28 GHz.

TABLE 1

| Composition compounding table (part by mass) | | | | Working example | | | | | | |
|---|---|---|---|---|---|---|---|---|---|---|
| | | | | 1 | 2 | 3 | 4 | 5 | 6 | 7 |
| (A-1) | X-45-6895 | A-1-1 | | 70.0 | 55.0 | 70.0 | 70.0 | 90.0 | 56.0 | 60.0 |
| (A-2) | X-45-1400 | A-2-1 | | 30.0 | 45.0 | | 25.0 | 10.0 | 24.0 | 15.0 |
| | X-45-1500 | A-2-2 | | | | 30.0 | | | | |
| (A-3) | BMI-5000 | A-3-1 | | | | | | 5.0 | | |
| | BMI-TMH | A-3-2 | | | | | | | 20.0 | 25.0 |
| | BMI-4000 | A-3-3 | | | | | | | | |
| (B) | Trigonox 101 | B-1 | | 1.0 | 1.0 | 1.0 | 1.0 | 1.0 | 1.0 | 1.0 |
| | 2E4MZ | B-2 | | | | | | | | |
| (C) | ANTAGE W-300 | C-1 | | 0.05 | 0.05 | 0.05 | 0.05 | 0.05 | 0.05 | 0.05 |
| (D) | Epoxy resin composition | D-1 | | | | | | | | |
| | Epoxy resin composition | D-2 | | | | | | | | |
| | Unsaturated polyester resin composition | D-3 | | | | | | | | |
| Evaluation results | Viscosity(25° C., Initial) | Pa·s | | 15.0 | 46.8 | 16.8 | 51.2 | 5.9 | 69.6 | 80.2 |
| | Viscosity(60° C., Initial) | Pa·s | | 0.8 | 2.3 | 0.8 | 2.5 | 0.3 | 2.6 | 2.8 |
| | Viscosity(25° C., After left at 25° C. for 72 hours) | Pa·s | | 15.1 | 46.8 | 16.8 | 51.3 | 5.9 | 70.1 | 80.2 |
| | Viscosity(60° C., After left at 60° C. for 10 min) | Pa·s | | 0.8 | 2.3 | 0.8 | 2.5 | 0.3 | 2.6 | 2.8 |
| | Curability | | | ○ | ○ | ○ | ○ | ○ | ○ | ○ |
| | Relative permittivity (10 GHz) | | | 2.47 | 2.42 | 2.47 | 2.41 | 2.41 | 2.62 | 2.72 |
| | Dielectric tangent (10 GHz) | | | 0.0018 | 0.0018 | 0.0019 | 0.0016 | 0.0019 | 0.0023 | 0.0026 |
| | Relative permittivity (28 GHz) | | | 2.47 | 2.41 | 2.49 | 2.41 | 2.42 | 2.69 | 2.75 |
| | Dielectric tangent (28 GHz) | | | 0.0018 | 0.0018 | 0.0019 | 0.0016 | 0.0021 | 0.0025 | 0.0030 |

TABLE 2

| Composition compounding table (part by mass) | | | | Comparative example | | | | | | | | | |
|---|---|---|---|---|---|---|---|---|---|---|---|---|---|
| | | | | 1 | 2 | 3 | 4 | 5 | 6 | 7 | 8 | 9 | 10 |
| (A-1) | X-45-6895 | A-1-1 | | 70.0 | 70.0 | 70.0 | 100.0 | 70.0 | 70.0 | 70.0 | | | |
| (A-2) | X-45-1400 | A-2-1 | | 30.0 | 30.0 | 30.0 | | | | | | | |
| | X-45-1500 | A-2-2 | | | | | | | | | | | |
| (A-3) | BMI-5000 | A-3-1 | | | | | | 30.0 | | | | | |
| | BMI-TMH | A-3-2 | | | | | | | 30.0 | | | | |
| | BMI-4000 | A-3-3 | | | | | | | | 30.0 | | | |
| (B) | Trigonox 101 | B-1 | | 1.0 | | | 1.0 | 1.0 | 1.0 | 1.0 | | | |
| | 2E4MZ | B-2 | | | 1.0 | 1.0 | | | | | | | |
| (C) | ANTAGE W-300 | C-1 | | | 0.05 | | 0.05 | 0.05 | 0.05 | 0.05 | | | |
| (D) | Epoxy resin composition | D-1 | | | | | | | | | 100.0 | | |
| | Epoxy resin composition | D-2 | | | | | | | | | | 100.0 | |
| | Unsaturated polyester resin composition | D-3 | | | | | | | | | | | 100.0 |
| Evaluation results | Viscosity(25° C., Initial) | Pa·s | | 15.0 | 15.0 | 16.8 | 3.5 | Unmeasurable | 51.2 | BMI-4000 did not dissolve, but remained separated | 0.4 | 0.2 | 0.3 |
| | Viscosity(60° C., Initial) | Pa·s | | 0.8 | 0.8 | 0.8 | 0.1 | 50.2 | 2.5 | | <0.1 | <0.1 | Unmeasurable |
| | Viscosity(25° C., After left at 25° C. for 72 hours) | Pa·s | | 20.8 | 15.0 | 16.8 | 4.2 | Unmeasurable | 51.3 | | 1.2 | 0.2 | Unmeasurable |
| | Viscosity(60° C., After left at 60° C. for 10 min) | Pa·s | | 4.9 | 0.8 | 0.8 | 3.1 | 50.2 | 2.5 | | 4.3 | <0.1 | Unmeasurable |
| | Curability | | | ○ | X | X | ○ | ○ | ○ | | ○ | ○ | ○ * |
| | Relative permittivity (10 GHz) | | | 2.47 | — | — | 2.51 | 2.39 | 2.82 | | 3.41 | 3.56 | 4.52 |

TABLE 2-continued

| Composition compounding table | Comparative example | | | | | | | | | |
|---|---|---|---|---|---|---|---|---|---|---|
| (part by mass) | 1 | 2 | 3 | 4 | 5 | 6 | 7 | 8 | 9 | 10 |
| Dielectric tangent (10 GHz) | 0.0018 | — | — | 0.0034 | 0.0016 | 0.0061 | | 0.019 | 0.026 | 0.021 |
| Relative permittivity (28 GHz) | 2.47 | — | — | 2.50 | 2.41 | 2.86 | | 3.52 | 3.67 | 4.58 |
| Dielectric tangent (28 GHz) | 0.0018 | — | — | 0.0036 | 0.0017 | 0.0067 | | 0.021 | 0.036 | 0.027 |

\* Since curing took place too early, molding at 150° C. was impossible; the composition was cured under a condition of 50° C., 30 min, and dielectric property evaluation was conducted using a cured product thereof.

The heat-curable maleimide resin composition for RTM of the present invention is such that as a composition, it has a favorable fluidity; particularly in the temperature range of room temperature to 100° C., the composition maintains a low viscosity, the viscosity thereof does not increase easily, and the composition thus has a superior preservation stability and moldability. Further, the cured product of the composition is superior in dielectric properties where a low relative permittivity and a low dielectric tangent were exhibited.

In contrast, as is clear from the comparative example 1, in the case of a composition containing no polymerization inhibitor (C), the viscosity thereof rose early i.e. the moldability of the composition as a molding material for RTM is problematic. Further, as is clear from the comparative examples 2 and 3, in the case of a composition containing no radical polymerization initiator (B), the composition did not cure under a curing condition of 150° C., 5 min i.e. the composition is unsuitable as a molding material for RTM in terms of curability.

Next, a fiber-reinforced composite material was produced by the following method, using each resin composition prepared in the working example 1 and the comparative examples 1 to 4; the appearance and moldability of the fiber-reinforced composite material were then observed.

Production of Fiber-Reinforced Composite Material, Appearance and Moldability

Four pieces of quartz cloth each cut out into a size of 495 mm×495 mm (SQX-2116 by Shin-Etsu Chemical Co., Ltd.) were laminated on top of each other, and then placed into a mold having a plate-shaped cavity of a size of 500 mm×500 mm×0.8 mm before clamping the mold. Next, after heating the mold to 60° C., a resin injection device was then used to inject each resin composition that had been preheated at 60° C. for 10 min into the mold at an injection pressure of 0.2 MPa, thereby allowing the quartz cloths to be impregnated with the resin composition. Later, after curing the resin composition by heating the mold at 180° C. for two hours, the cured product was then cooled to 25° C. to obtain a fiber-reinforced composite material. The fiber-reinforced composite material was then taken out from the mold, and the appearance and moldability thereof were observed.

The fiber-reinforced composite material of the working example 1 exhibited no abnormality in its appearance as there were observed no occurrence of, for example, unfilling and voids. In contrast, as for the fiber-reinforced composite material of the comparative example 1, unfilling occurred in four corners thereof; and as for the fiber-reinforced composite materials of the comparative examples 2 and 3, fiber-reinforced composite materials were unable to be obtained in the first place as the resin composition(s) failed to be cured. In the case of the fiber-reinforced composite material of the comparative example 4, while unfilling was not observed, voids were partially confirmed, which contributed to an unsatisfactory appearance; further, due to an insufficient toughness, only the resin had partially chipped off when removing the fiber-reinforced composite material from the mold.

As can be seen from the above results, it was confirmed that the heat-curable maleimide resin composition for RTM of the present invention is suitable for use in a fiber-reinforced composite material.

What is claimed is:

1. A heat-curable maleimide resin composition for RTM, comprising:
(A-1) a maleimide compound having at least one dimer acid skeleton-derived hydrocarbon group per one molecule, and having a viscosity of not higher than 20 Pa·s;
(A-2) a maleimide compound having at least one dimer acid skeleton-derived hydrocarbon group per one molecule, having a viscosity of greater than 20 Pa·s, and exhibiting a fluidity at 25° C.;
(B) a radical polymerization initiator; and
(C) a polymerization inhibitor,
wherein the viscosities of the components (A-1) and (A-2) are measured in accordance with a method described in JIS Z8803:2011, at a measurement temperature of 25° C., and using a Brookfield-type rotary viscometer with a rotation rate of a spindle being set to 5 rpm,
wherein the component (A-2) is a maleimide compound represented by the following formula (2):

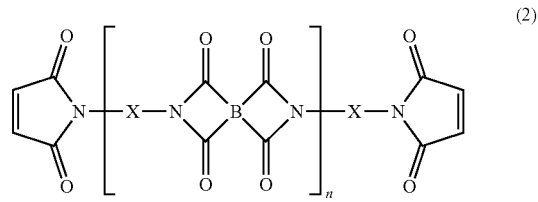

(2)

wherein B independently represents a cyclic structure-containing tetravalent organic group, X independently represents a divalent hydrocarbon group having 6 to 200 carbon atoms, at least one X is a dimer acid skeleton-derived hydrocarbon group, and n is 1 to 100, and wherein B in the formula (2) is any one of the tetravalent organic groups represented by the following structural formulae:

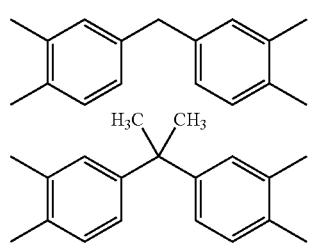

-continued

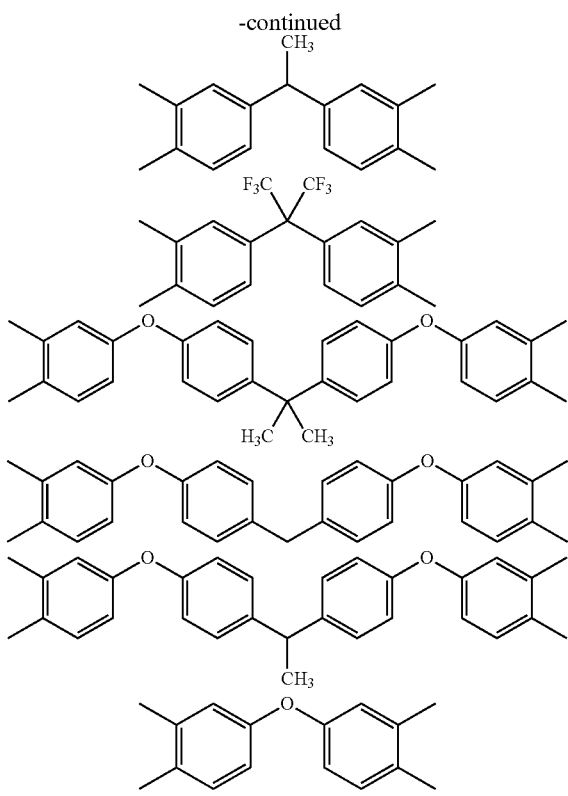

wherein bonds in these structural formulae that are yet unbonded to substituent groups are to be bonded to carbonyl carbons forming cyclic imide structures in the formula (2).

2. The heat-curable maleimide resin composition for RTM according to claim 1, wherein the composition has a viscosity of not higher than 3 Pa·s when measured in accordance with the method described in JIS Z8803:2011, at a measurement temperature of 60° C., and using a Brookfield-type rotary viscometer with a rotation rate of a spindle being set to 5 rpm.

3. The heat-curable maleimide resin composition for RTM according to claim 1, wherein the component (A-1) is a maleimide compound represented by the following formula (1):

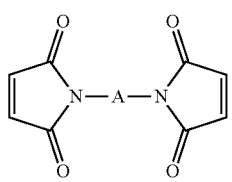

wherein A represents a dimer acid skeleton-derived hydrocarbon group.

4. The heat-curable maleimide resin composition for RTM according to claim 1, wherein a ratio between (A-1) and (A-2) on a mass basis is (A-1):(A-2)=95:5 to 40:60.

5. A fiber-reinforced composite material formed of the heat-curable maleimide resin composition for RTM according to claim 1 and a reinforced fiber.

6. The fiber-reinforced composite material according to claim 5, wherein the reinforced fiber is a quartz glass fiber.

7. A radome having the fiber-reinforced composite material according to claim 6.

8. A heat-curable maleimide resin composition for RTM, comprising:
(A-1) a maleimide compound having at least one dimer acid skeleton-derived hydrocarbon group per one molecule, and having a viscosity of not higher than 3 Pa·s;
(A-2) a maleimide compound having at least one dimer acid skeleton-derived hydrocarbon group per one molecule, having a viscosity of greater than 20 Pa·s, and exhibiting a fluidity at 25° C.;
(B) a radical polymerization initiator; and
(C) a polymerization inhibitor,
wherein the viscosities of the components (A-1) and (A-2) are measured in accordance with a method described in JIS Z8803:2011, at a measurement temperature of 25° C., and using a Brookfield-type rotary viscometer with a rotation rate of a spindle being set to 5 rpm,
wherein the component (A-1) is a maleimide compound represented by the following formula (1):

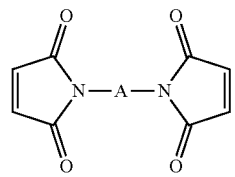

wherein A represents a dimer acid skeleton-derived hydrocarbon group,
wherein the component (A-2) is a maleimide compound represented by the following formula (2):

$$\text{(2)}$$

wherein B independently represents a cyclic structure-containing tetravalent organic group, X independently represents a divalent hydrocarbon group having 6 to 200 carbon atoms, at least one X is a dimer acid skeleton-derived hydrocarbon group, and n is 1 to 100, and wherein B in the formula (2) is any one of the tetravalent organic groups represented by the following structural formulae:

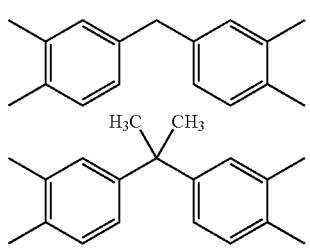

-continued

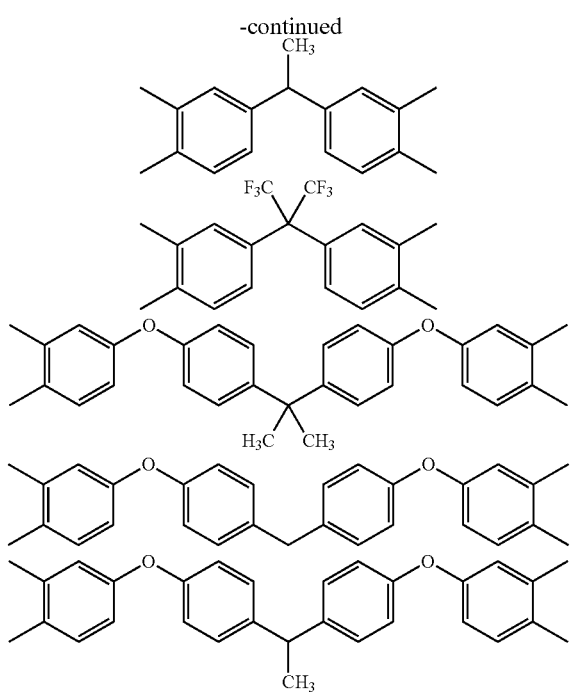

-continued

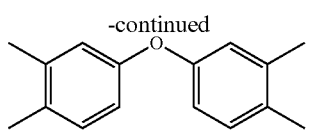

wherein bonds in these structural formulae that are yet unbonded to substituent groups are to be bonded to carbonyl carbons forming cyclic imide structures in the formula (2), wherein a ratio between (A-1) and (A-2) on a mass basis is (A-1):(A-2)=95:5 to 40:60.

9. A fiber-reinforced composite material formed of the heat-curable maleimide resin composition for RTM according to claim 8 and a reinforced fiber.

10. The fiber-reinforced composite material according to claim 9, wherein the reinforced fiber is a quartz glass fiber.

11. A radome having the fiber-reinforced composite material according to claim 10.

* * * * *